(12) United States Patent
Brosnahan

(10) Patent No.: US 7,082,577 B1
(45) Date of Patent: Jul. 25, 2006

(54) METHOD FOR DISPLAYING AN INTERNET WEB PAGE WITH AN AREA OF FOCUS

(75) Inventor: Roberta G. Brosnahan, Palo Alto, CA (US)

(73) Assignee: Freedom Scientific, Inc., St. Petersburg, FL (US)

( * ) Notice: Subject to any disclaimer, the term of this patent is extended or adjusted under 35 U.S.C. 154(b) by 621 days.

(21) Appl. No.: 10/127,864

(22) Filed: Apr. 23, 2002

Related U.S. Application Data

(60) Provisional application No. 60/353,040, filed on Jan. 30, 2002.

(51) Int. Cl.
*G06F 3/00* (2006.01)
(52) U.S. Cl. ........................... 715/860; 715/767
(58) Field of Classification Search ................ 715/784, 715/767, 747, 522, 523, 524, 526, 528, 860; 707/104.1
See application file for complete search history.

(56) References Cited

U.S. PATENT DOCUMENTS 6,026,409 A * 2/2000 Blumenthal .............. 707/104.1
6,476,831 B1 * 11/2002 Wirth et al. ................ 715/784
6,750,886 B1 * 6/2004 Bergstedt .................... 715/784

* cited by examiner

*Primary Examiner*—Kristine Kincaid
*Assistant Examiner*—Lê Nguyen
(74) *Attorney, Agent, or Firm*—Ronald E. Smith; Smith & Hopen, P.A.

(57) ABSTRACT

A method for displaying an internet web page with an area of focus to reduce viewer distraction. The selected area of focus is displayed with the normal text, graphic and background color attributes as created by the web page designer. The area of focus may be, for example, a single sentence or a paragraph and may include one or more frames from the web page. Shading is applied to other portions of the displayed web page which become a less pronounced area out of focus. The area of focus may be moved with a pointing device such as a mouse or a keyboard. The degree of shading may be set by the computer user. The computer displaying the web page may be programmed to read the text in the area of focus with synthesized speech and to move the area of focus as the text is read.

12 Claims, 10 Drawing Sheets

| web browser |
|---|
| The Internet is a worldwide system of computers that are able to share data.  It was conceived by the U.S. government in 1969 and was originally known as ARPANet.  In the beginning the goal was to create a network to allow researchers from different universities to be able to share information. | Today the Internet is a public, cooperative, and self-sustaining entity accesible to millions of people worldwide.   Physically the Internet uses currently existing public telecommunications networks maintained by the telephone companies. |

METHOD FOR DISPLAYING AN INTERNET WEB PAGE WITH AN AREA OF FOCUS

CROSS-REFERENCE TO RELATED APPLICATIONS

Priority is claimed to U.S. provisional patent application Ser. No. 60/353,040 filed Jan. 30, 2002.

STATEMENT REGARDING FEDERALLY SPONSORED RESEARCH OR DEVELOPMENT

Not Applicable.

TECHNICAL FIELD

The invention relates to displaying information from the internet on a computer monitor and more particularly to a method which masks distracting visual clutter, both text and graphics, and aids the reader to focus on important information.

BACKGROUND OF THE INVENTION

The ever-increasing capabilities of computer networks and the internet has brought an increasing demand for information accessibility. Not only do people use desktop computers to access networked data information, various communication devices also provide a capability for displaying large volumes of information. It is increasingly important now for a user of modern communication devices to be able to sort through and make sense of the information available on a company-wide intranet, the internet and/or other networked communication infrastructures. Electronic information may be accessed by numerous users using many different types of display devices, such as desktop computers, laptop computers, cell phones, personal digital assistants (PDAs), etc.

Many internet users, for example, have a difficult time in focusing on specific information that they are searching for due both to the large amount of information which may be compressed into a single screen or web page and to the attempt of web page designers and marketers to draw the viewers attention to specific information, such as advertisements. Focusing on the important information can be a particular problem for computer users who are easily distracted, such as those who suffer from attention deficit problems. Accordingly, it would be desirable to have the capability to give the computer user the ability to focus on specific portions of displayed information and to de-emphasize other displayed text and graphic information.

Software is available for computers for reading text displayed on a computer monitor. This software is particularly useful for students having certain learning disabilities. For example, some individuals with learning disabilities have a significantly greater comprehension of oral information than information which they are reading. These individuals are helped when the information is read at the same time that it is displayed.

BRIEF SUMMARY OF THE INVENTION

The invention is directed to a method for controlling the displaying electronic documents on a computer. The computer, which is connected to display an internet web page and other network information, is programmed such that an area of focus or emphasis is distinct from information in a surrounding out of focus area. As used herein, the term "area of focus" of "focus area" is intended to mean a selected area of information in a displayed area which stands out from the remainder of the displayed information. It is the area of focus of the viewer's attention. The area of focus may be a word, a block of text or a graphic image. Preferably the area of focus is displayed with the normal color settings specified by the web page or other document. The remaining "area out of focus" may be shown, for example, with grayed or darker shading so that the area of focus is dominant. The term "focus element" refers to the word, hyperlink, or html form control which has the current input focus. The focus element acts as a cursor or caret to indicate the current position within a web page. The focus element can be moved around with a pointing device, such as a mouse or with a keyboard commands.

In another aspect of the invention, the method is adapted for displaying formatted documents such as hypertext web pages residing on a computer or delivered across a network or delivered from a server computer via a communications network such as the internet. In still another aspect of the invention, the user is able to move the area of focus around in the content of the document being displayed. As the user moves the area of focus, the rendered display of the document is dynamically updated to maintain the attributes of the area of focus and the attributes of the area out of focus. The degree to which the area out of focus is shaded or grayed may be adjustable as a user setting to increase or decrease the shading effect.

The computer used for viewing the web page and for creating the area of focus and the area out of focus also may include known software for converting displayed text to speech. This software may be synchronized with the software of the present invention so that the area of focus coincides with the spoken text.

Various objects and advantages of the invention will become apparent from the following detailed description of the invention and the accompanying drawings.

BRIEF DESCRIPTION OF THE DRAWINGS

FIG. 4 is a view of the exemplary computer display screen of FIG. 3, with the area of focus and area out of focus moved;

DETAILED DESCRIPTION OF THE INVENTION

Figure 1:
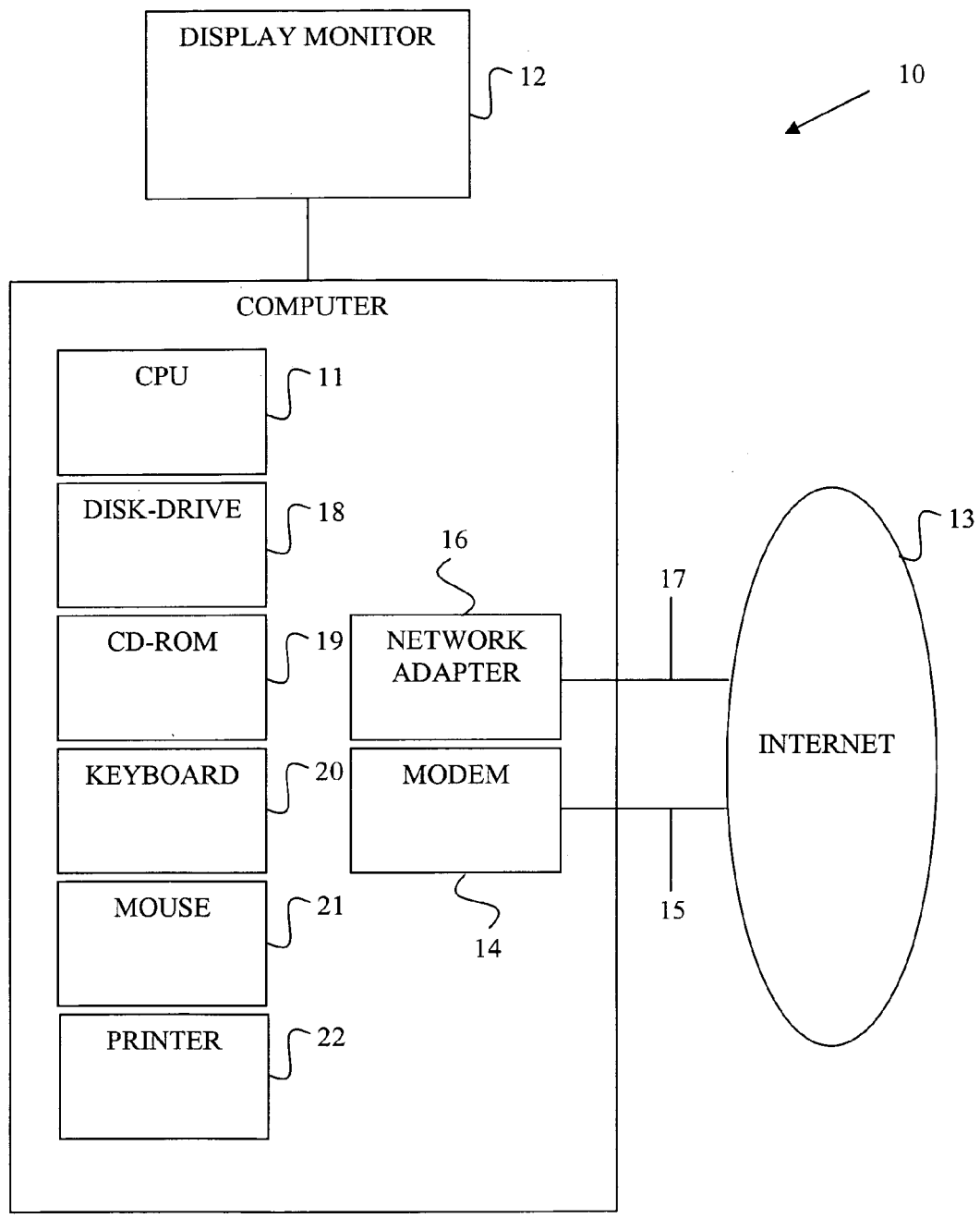
FIG. 1 is a block diagram of an exemplary personal computer connected to a network, such as the internet.

The invention is directed to a method for controlling the displaying of information from the internet or other sources on a monitor of a program controlled computer. The computer may be, for example, a conventional desktop personal computer, a laptop computer, a PDA or a cell phone of the type capable of displaying information from the internet. FIG. 1 of the drawings shows an exemplary computer 10 generally include a central processing unit (CPU) 11, a display monitor 12, and means for connecting to the internet 13, such as a modem 14 connected to a telephone line 15 or a network adapter 16 connected to a cable modem or to a local area network (LAN) 17 which is in turn connected to the internet. The computer 10 also may include a disk drive 18, a CD-ROM drive 19, a keyboard 20, a pointing device such as a mouse 21, a printer 22 and various other known features and peripheral devices. It should be appreciated that the invention may be implemented in various known types of computers having various known types of access to the internet. The invention also may be implemented to control the display of stored information which is available from various known sources, such as from a computer hard drive or from a storage disk.

Operation of the computer 10 may be controlled by a variety of commercially available computer programs, including an operation system such as one of the Microsoft Windows programs or Apple OS, and program applications. One application program, known as a browser, allows the computer 10 to connect to the internet via a communications device, such as the modem 14 or the network adapter 16. Internet pages are delivered in Hyper Text Markup Language (HTML). The browser software allows the computer to access and display HTML pages. Using the browser software, the computer user enters an address or Universal Record Locator (URL) for a desired web page. This is communicated to the server computer on the internet containing the specified web page, thereby establishing a logical connection with the server computer. The server computer then responds to the user's request by sending the web page to the computer 10 for display on the monitor 12. The web page may contain text, graphic images, form controls, etc. The user may then read and scroll through the displayed information, or enter data into the web page, as permitted. Each piece of information has associated display attributes or controlling the way in which the information is displayed.

A displayed web page may contain text and/or graphics which is of interest to the user, and also may include information which is of no interest to the user. Some computer users have difficulty in separating important information from the unimportant and distracting information. This can be a particular problem with school children who have attention deficit disorder (ADD). The problem is aggravated when the unimportant information is specifically designed with display attributes to attract the user's attention. This is frequently the case of advertisements which may use blinking or changing graphics and bright colors to attract the viewer's attention.

According to the invention, the information is displayed on the monitor with a portion of the displayed information in an area of focus and with the remainder of the information as an area out of focus. This is achieved by displaying the area of focus information in a normal mode, preferably with the display attributes created by the designer of the displayed information. The computer 10 is programmed so that the remainder of the displayed information is placed in the area out of focus, or in a de-emphasized mode, by changing the shading of text and graphic information and the surrounding background in the area out of focus. For example, the area out of focus text and graphics may be displayed in light gray and the surrounding background may be displayed in a darker gray. Thus, the computer is programmed to mask distracting visual clutter, both text and graphics, to aid the reader to focus on only a selected portion of the displayed information. It will be apparent that various shading may be used for de-emphasizing the displayed material in the area out of focus.

Figure 2:
FIG. 2 is a view of an exemplary computer display screen showing a conventional internet web browser application which renders a web page on the display screen with normal viewing attributes specified by the web page control information.

FIGS. 2–7 illustrate various screens which may be viewed on the computer monitor 12 without and with the invention. FIG. 2 shows an exemplary display screen 25 in which information from an internet website is displayed with its normal viewing attributes as specified by web page control information.

Figure 3:
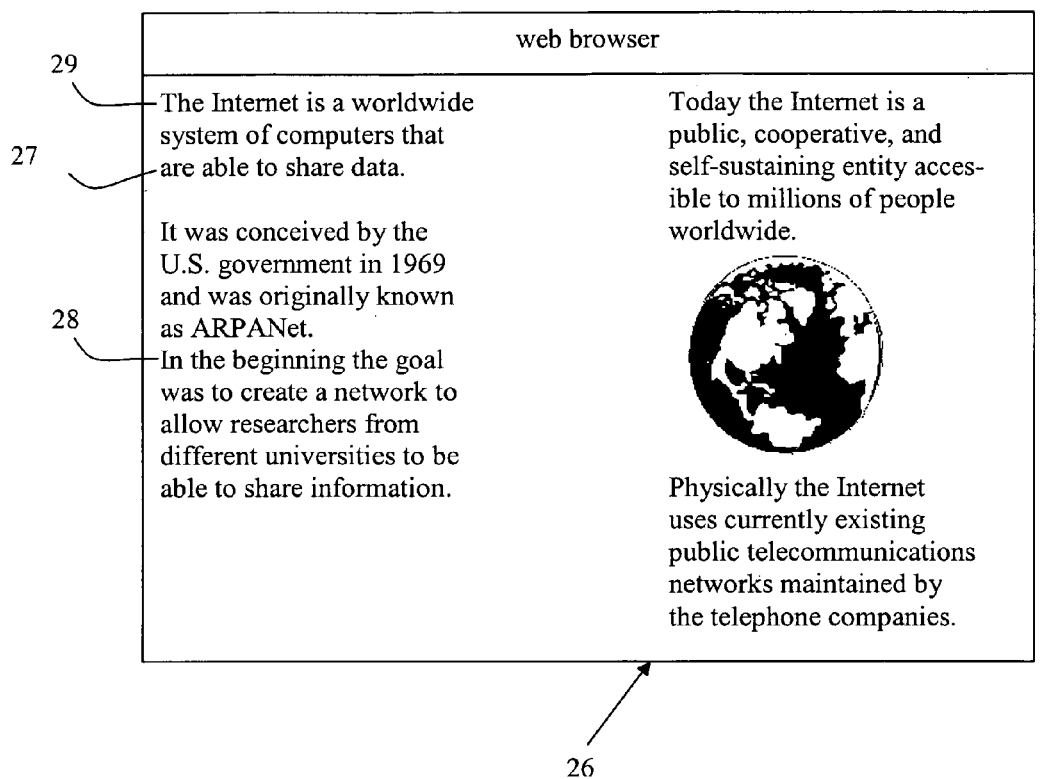
FIG. 3 is a view of the exemplary computer display screen of FIG. 2 showing the result of applying shading to emphasize an area of focus and de-emphasize the area out of focus according to a preferred embodiment of the invention.

FIG. 3 shows an exemplary display screen 26 with the same information as in FIG. 2. However, the form in which the information is displayed is modified in accordance with the invention. The information displayed on the screen 26 has an area of focus 27 and an area out of focus 28. Except for a focus element 29 in the area of focus 27, the entire area of focus is shown displayed with normal viewing attributes as specified by the web page control information. The focus element 29 in the area of focus positions the area of focus in the screen 26. The focus element 29 may be, for example, a single word, as shown, or a cursor or carat. Alternately, the focus element 29 is located at any area within the area of focus or may consist of all displayed information in the area of focus. For example, when a focus element 29 is selected, a sentence containing the focus element 29 may be selected, or a paragraph containing the focus element may be selected, or a graphic image may be selected. The area of focus is determined by how the web page is constructed. The focus element 29 will appear with its normal viewing attributes. The area out of focus 28 may simply be darkened or shaded to be less dominant, such as dark gray text and graphics on a lighter gray background. Preferably, the area out of focus 28 should still be visible so that the user can see where to position the area of focus 28. The area of focus may be moved, for example, with a pointing device such as a mouse or with the arrow keys on a keyboard. The area out of focus may be moved forward or backward, for example, one sentence at a time or one paragraph at a time, or to any selected location on the display screen.

FIG. 4 shows a display screen 30 which is similar to the screen 26 of FIG. 3, except that it has an area of focus 31 which has been advanced to the next text area. An area out of focus 32 now encompasses the area which was the area of focus 27 in FIG. 3.

Figure 5:
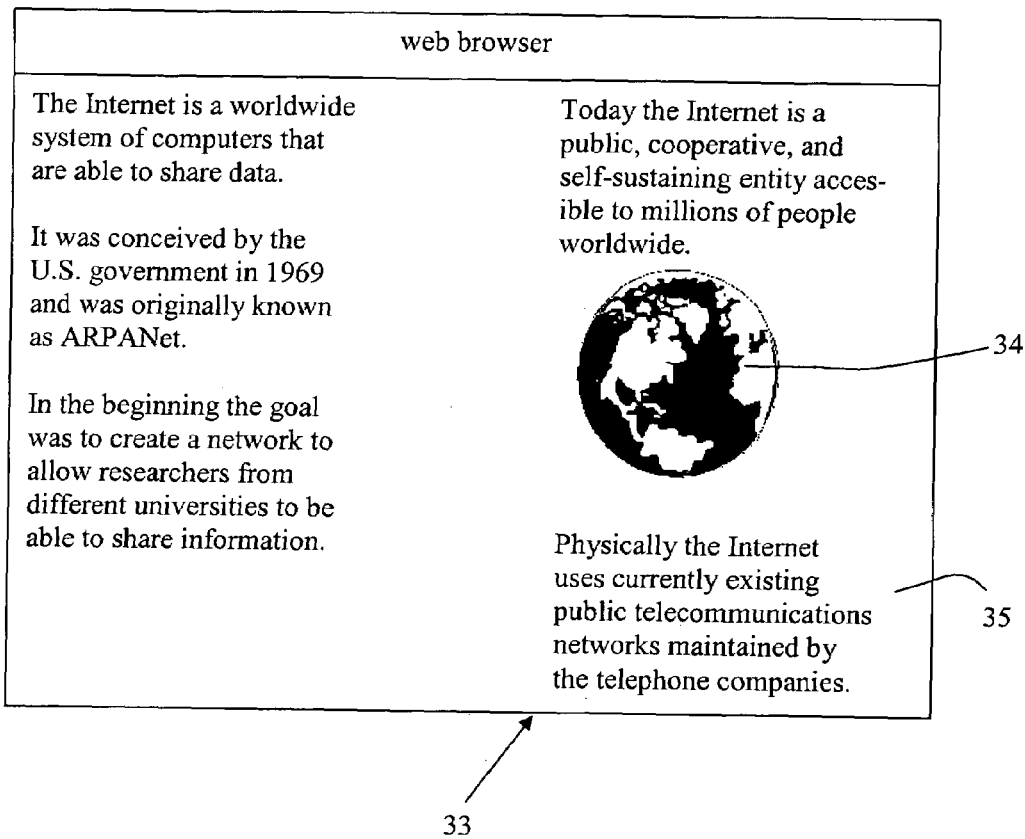
FIG. 5 is a view of the exemplary computer display screen of FIGS. 2–4, wherein the area of focus is non-text content of the screen.

FIG. 5 shows a display screen 33 which is similar to screen 30 of FIG. 4, except that an area of focus 34 consists of graphics and an area out of focus 35 consists of all other information areas on the screen 33.

Figure 6:
FIG. 6 is a view of the exemplary computer display screen of FIG. 2, wherein the area out of focus is shaded to a greater degree than in FIG. 2.

FIG. 6 shows a display screen 36, which is similar to the screen 26 of FIG. 3, except that an area out of focus 37 is shaded to a greater degree than the area out of focus 28 in FIG. 3.

Figure 7:
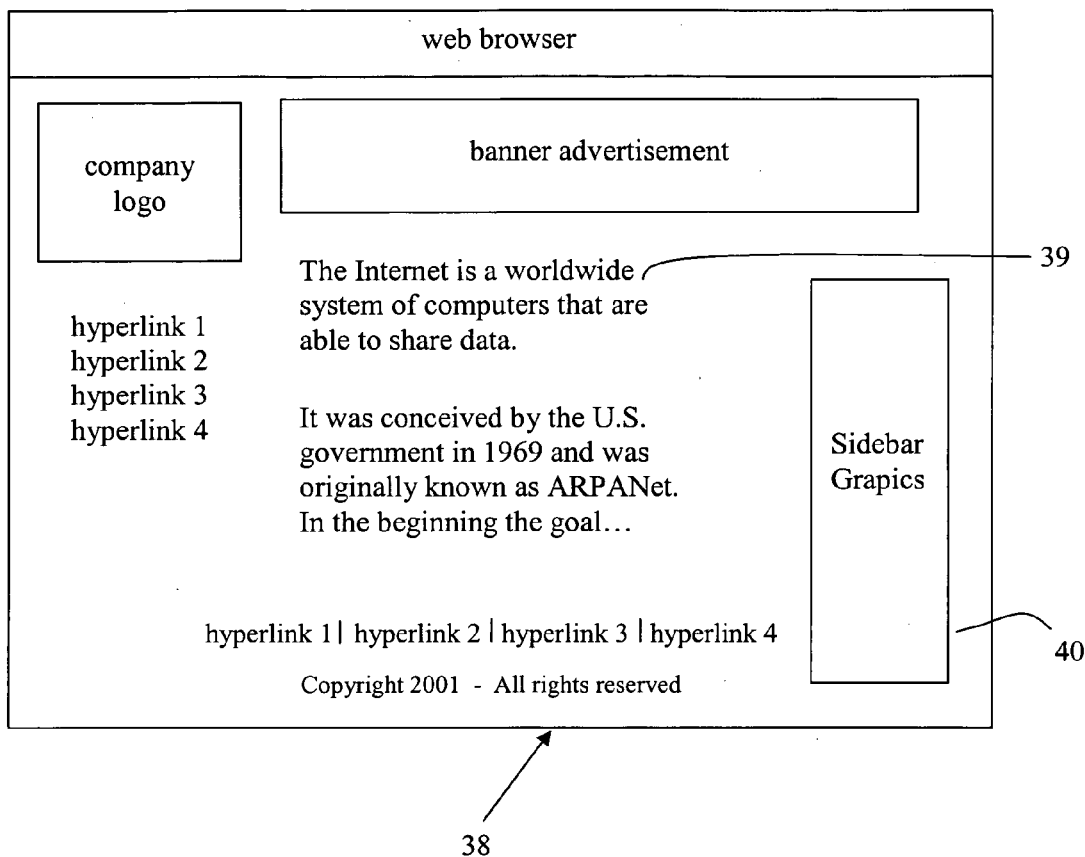
FIG. 7 is a view of an exemplary computer display screen having more advanced content that the screen of FIG. 2, with an area of focus and an area out of focus according to the invention.

FIG. 7 is a view of display screen 38 having more advanced content than the display screens of FIGS. 3–6. The display screen 38 is shown with an area of focus 39 and an area out of focus 40.

Figure 8:
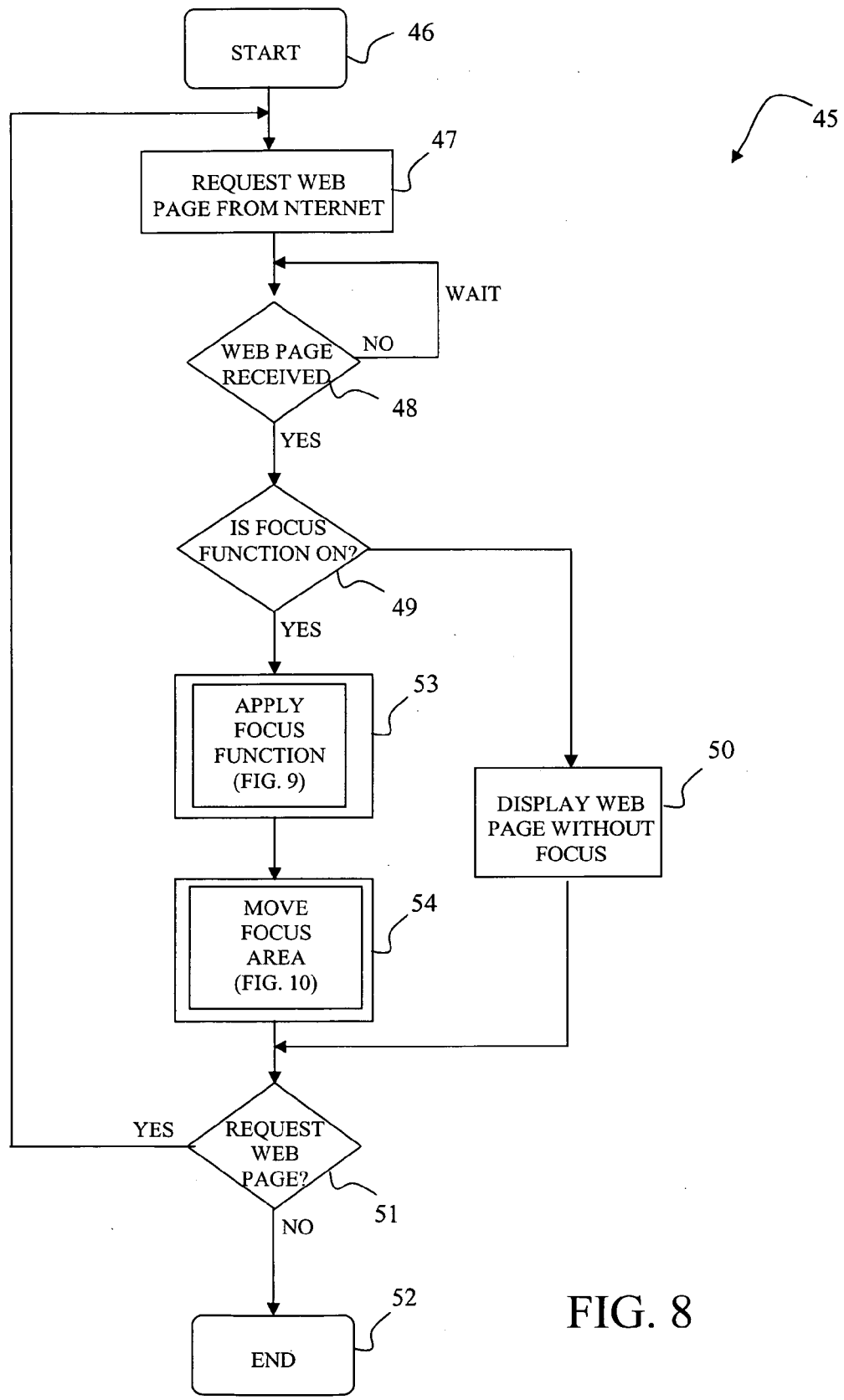
FIG. 8 is a flow diagram outlining the program steps for applying the display attributes to the area of focus and the area out of focus when the web page is loaded into the computer.
Figure 9:
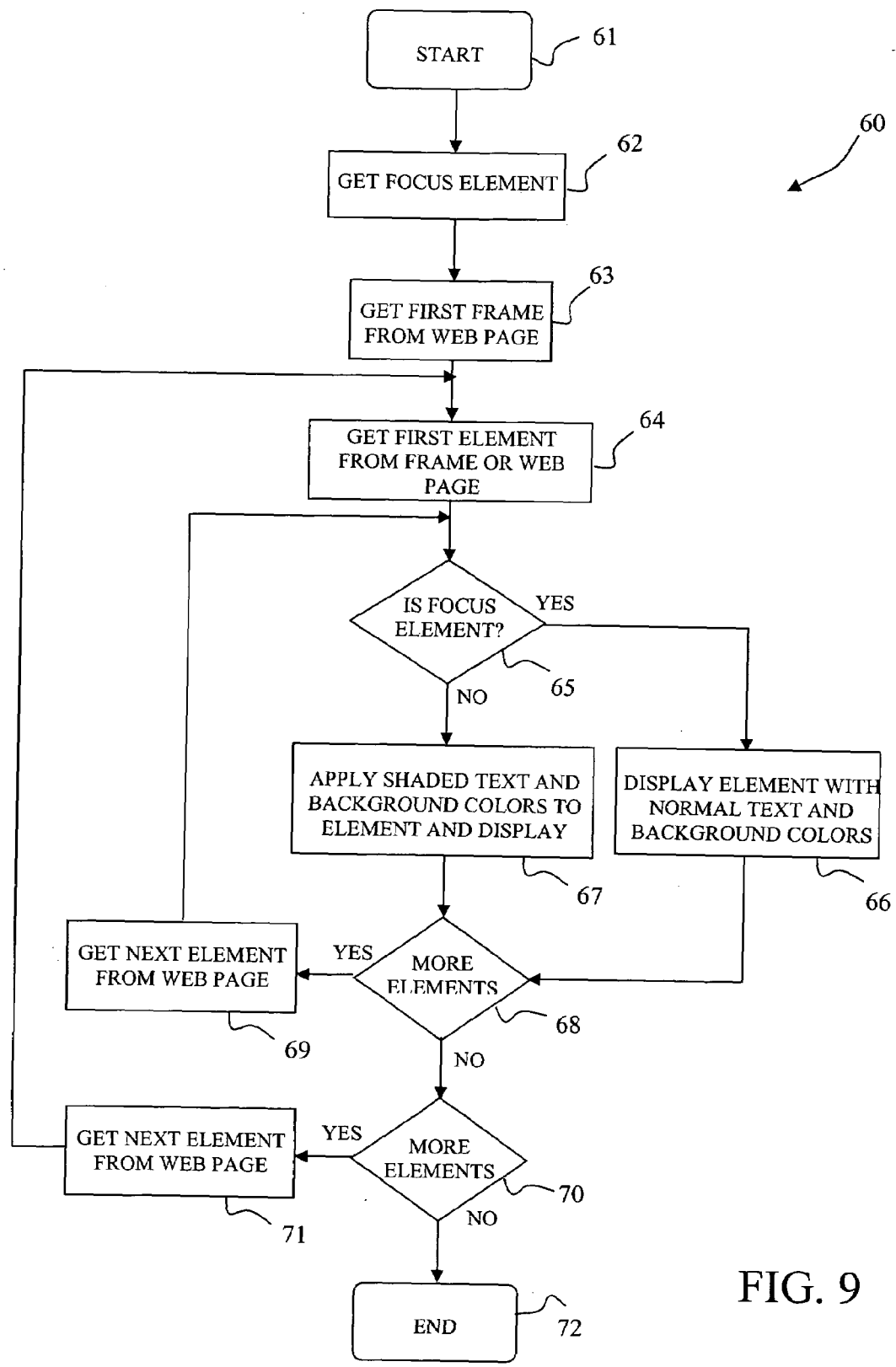
FIG. 9 is a flow diagram outlining the program steps for applying the text and background shading to the area out of focus.
Figure 10:
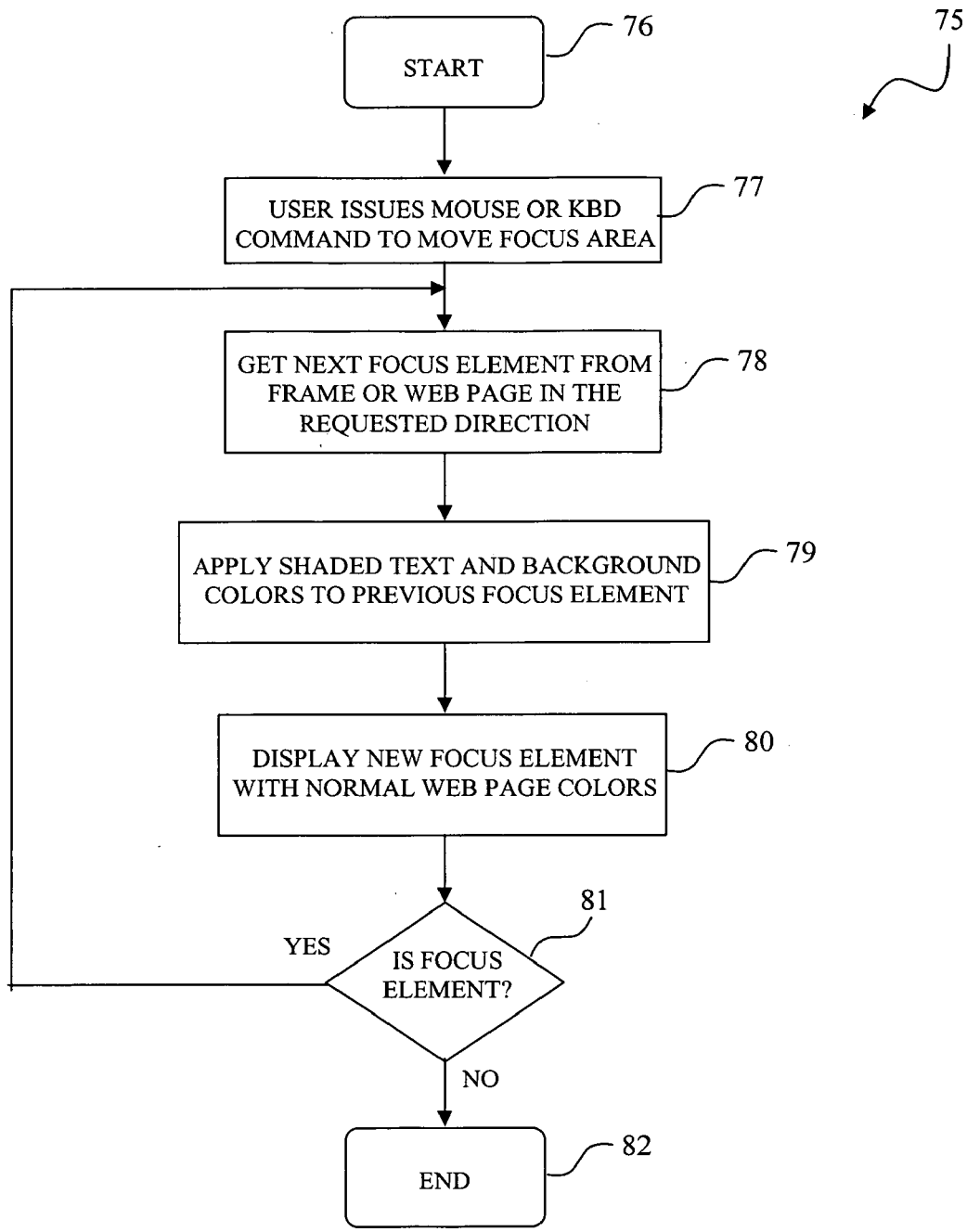
FIG. 10 is a flow diagram outlining the program steps of moving the area of focus within a web page.

According to the invention, a computer is programmed to display information on a monitor so that the displayed information which is intended to draw a user's attention or focus is in an area of focus and all remaining displayed information is in an area out of focus. FIGS. 8–10 are flow charts illustrating operation of a preferred embodiment of a computer program for carrying out the invention.

Referring first to FIG. 8, a flow diagram is shown for the program steps of a routine 45 for applying the display attributes to the area of focus and to the area out of focus when a web page is loaded into a computer for display. The routine 45 is entered at a start block 46. A request for a web page from the internet is made at a block 47. The routine then waits at a block 48 until the requested web page is downloaded and stored. Once the page is received, a query is made at a block 49 as to whether the focus function is on. If the focus function is not on, the web page is displayed with its original display attributes as received at a block 50 and the program proceeds to a block 51. A further query is made at the block 51 as to whether a new web page is requested. If no further web page is requested, the routine ends at a block 52. If there is a request for a new web page, the routine returns from the block 51 to the block 47.

If it is determined at the block 49 that the focus function is turned on, the routine proceeds to a block 53 where a subroutine is run to apply the focus function to the received web page. This function is shown in FIG. 9 and described below. The program then advances to a block 54 where a check is made to determine if the user has issued a command to move the area of focus. If so, the focus area is moved. A subroutine for checking and moving the focus area is shown in FIG. 10 and described below. From the block 54, the program advances to the block 51. If there is a request for a new web page, the program returns to the block 47. If there is no request, the program advances from the block 51 to the end block 52.

Referring now to FIG. 9, the steps of a program subroutine 60 are illustrated for applying the focus function to a received web page for modifying the way in which the web page is displayed. The subroutine 60 illustrates the steps which occur at the block 53 (FIG. 8). The program enters at a start block 61 which is entered from the block 49 (FIG. 8). At a block 62 where it gets data identifying the focus element is obtained. For a newly displayed screen of information, this may be the first element on the screen. At a block 63, the program gets the first frame from the web page. It then gets the first element from the frame or web page at a block 64. Once the first element is determined, a query is made at a block 65 to determine if the first frame contains the first element. If it does, then the first frame is the area of focus and this frame is displayed in normal attributes at a block 66. If the first frame does not contain the first element, then shading changes are applied to the text and background for the element at a block 67 and the information is displayed.

Both blocks 66 and 67 connect to a block 68 which queries whether there are more elements for the displayed screen. If so, the program advances to a block 69 where the next web page element is obtained and returns to the block 65. A check is made to determine if the next element if a focus element and the program then advances to either the block 66 for displaying in the normal mode or to the block 67 for displaying with shading for area out of focus text. If it is determined at block 68 that there are no more elements to the web page, the program advances to a block 70 where a query is made to determine if there are more frames. If so, the program switches to the next frame at a block 71 and returns to the block 64 where the first element from the frame is identified. If it is determined at the block 70 that there are no more frames, the subroutine ends at a block 72 and advances to the block 54 (FIG. 8).

FIG. 10 shows the steps in a subroutine 75 for moving the area of focus and represents details of the block 54 (FIG. 8). The subroutine 75 is entered at a start block 76 and advances to a block 77 where the user issues a command to move the area of focus. This command may be issued, for example, with a computer mouse or with arrow keys on a keyboard. The program then gets the next focus element from the frame or from the web page in the requested move direction at a block 78. The area out of focus shading is then applied to the displayed previous focus element at a block 79, and the new focus element is displayed with normal web page appearance at a block 80. A check is made at a block 81 to determine if there is a further command to move the area of focus. If so, the program returns to the block 78 and cycles through the blocks 79 and 80. If there are no further commands to move the area of focus at the block 81, the subroutine ends at a block 82 and the program returns to the block 51 (FIG. 8).

The program may be designed to allow the computer user to select the type and degree of shading applied to information in the area out of focus. The computer also may be programmed so that when the web page is first downloaded, the first paragraph or the first word is assigned to the area of focus. The computer user may subsequently select the area of focus. Alternately, when the web page is first downloaded, the entire displayed screen may be initially displayed with its normal attributes. The user may then use the mouse or the keyboard to select the first area of focus.

The invention may be used in conjunction with other known programming features. For example, software is available to help students with learning disabilities by reading text as it is displayed on a computer screen. The method of the present invention may be used with such a program so that when an area of focus is selected, the text in the area of focus is read out loud to the computer user through the generation of synthetic speech. Thus, the method of the invention helps the student focus on the text as it is being read by the computer.

It will be appreciated that various modifications and changes may be made to the above described preferred embodiment of a method for displaying information on a computer monitor with an area of focus without departing from the scope of the following claims. For example, in the preferred embodiment of the invention, the information is in the form of a web page downloaded from the internet. The invention also may be adapted to provide an area of focus for displayed information which is read from an external or an internal memory device connected to a computer. The memory device may be, for example, a hard drive, a floppy drive or any other types of devices which can store information which can be displayed on the computer.

What is claimed is:

1. A method for displaying information on a computer screen comprising the steps of:

a) obtaining a page of information to be displayed, such information having display attributes associated therewith;
b) initiating a focus element on the page to determine information to be displayed in an area of focus;
c) modifying the display attributes associated with the information on the page such that information outside the area of focus is visually distinct from the portion of information comprised in the area of focus; and
d) moving said area of focus of displayed information in response to commands from a computer user to move the focus element.

2. A method for displaying information on a computer screen, as set forth in claim 1, and wherein the display attributes associated with information outside the area of focus are modified by changing the shading of such information.

3. A method for displaying information on a computer screen, as set forth in claim 2, wherein information outside the area of focus comprises foreground information and background information; and
wherein the background information outside the area of focus is visibly distinct from the foreground information outside the area of focus.

4. A method for displaying information on a computer screen, as set forth in claim 1, and wherein said area of focus is moved in response to commands given by a computer user using a mouse to move the focus element.

5. A method for displaying information on a computer screen, as set forth in claim 1, and wherein said area of focus is moved in response to commands given by a computer user using a keyboard to move the focus element.

6. A method for displaying information on a computer screen, as set forth in claim 1, and further including the step of reading text in the area of focus using synthesized speech.

7. A method for displaying a screen of stored information on a computer display, such information having display attributes assigned thereto, said method comprising the steps of:

a) initiating a focus element to select a portion of the screen of information to be in an area of focus;
b) modifying the display attributes or information to be displayed outside of said area of focus, whereby such modified display attributes have less visual emphasis than the assigned display attributes; and
c) moving said area of focus of displayed information in response to commands from a computer user to move the focus element.

8. A method for displaying a screen of stored information on a computer display, as set forth in claim 7, and wherein the display attributes associated with information determined to be outside said area of focus are modified by changing the shading of such information.

9. A method for displaying a screen of stored information on a computer display, as set forth in claim 8, wherein information determined to be outside said area of focus comprises foreground information and background information, and
wherein the background information outside the area of focus is visibly distinct from the foreground information outside the area of focus.

10. A method for displaying a screen of stored information on a computer display, as set forth in claim 7, and further including the step of moving said area of focus of displayed information in response to commands from a computer user to move the focus element.

11. A method for displaying a screen of stored information on a computer display, as set forth in claim 10, and wherein said area of focus is moved in response to commands given by a computer user using a mouse to move the focus element.

12. A method for displaying information on a computer screen, as set forth in claim 7, and further including the step of reading text in the area of focus using synthesized speech.

* * * * *